(12) United States Patent
McCauley et al.

(10) Patent No.: US 9,092,770 B2
(45) Date of Patent: Jul. 28, 2015

(54) APPARATUS, SYSTEM AND METHOD FOR STIMULATING AND SECURING RETAIL TRANSACTIONS

(71) Applicant: SECURECHECK, LLC, Alpharetta, GA (US)

(72) Inventors: Edward McCauley, Alpharetta, GA (US); Tony Donofrio, Greer, SC (US)

(73) Assignee: SECURECHECK, LLC, Alpharetta, GA (US)

( * ) Notice: Subject to any disclaimer, the term of this patent is extended or adjusted under 35 U.S.C. 154(b) by 0 days.

(21) Appl. No.: 14/175,608

(22) Filed: Feb. 7, 2014

(65) Prior Publication Data

US 2014/0217172 A1 Aug. 7, 2014

Related U.S. Application Data

(60) Provisional application No. 61/762,122, filed on Feb. 7, 2013, provisional application No. 61/762,106, filed on Feb. 7, 2013, provisional application No. 61/762,113, filed on Feb. 7, 2013.

(51) Int. Cl.
| | |
|---|---|
| *G06K 15/00* | (2006.01) |
| *G06Q 20/32* | (2012.01) |
| *G06Q 10/08* | (2012.01) |
| *G06Q 20/40* | (2012.01) |
| *G07G 3/00* | (2006.01) |
| *G06Q 20/20* | (2012.01) |
| *G06Q 30/02* | (2012.01) |
| *G06Q 30/04* | (2012.01) |

(52) U.S. Cl.
CPC ............ *G06Q 20/322* (2013.01); *G06Q 10/087* (2013.01); *G06Q 10/0833* (2013.01); *G06Q 20/20* (2013.01); *G06Q 20/3224* (2013.01); *G06Q 20/3226* (2013.01); *G06Q 20/3274* (2013.01); *G06Q 20/401* (2013.01); *G06Q 20/4016* (2013.01); *G06Q 20/40145* (2013.01); *G06Q 30/0201* (2013.01); *G06Q 30/04* (2013.01); *G07G 3/003* (2013.01)

(58) Field of Classification Search
USPC .................................. 235/383; 705/27.1, 27.2
See application file for complete search history.

(56) References Cited

U.S. PATENT DOCUMENTS 6,101,482 A * 8/2000 DiAngelo et al. ......... 705/26.62

* cited by examiner

*Primary Examiner* — Jamara Franklin
(74) *Attorney, Agent, or Firm* — Barnes & Thornburg LLP; Thomas J. McWilliams; Edward F. Behm, Jr.

(57) ABSTRACT

An apparatus, system and method of stimulating a retail transaction. The apparatus, system and method may include obtaining, via an opt-in to an in-store wireless network, of consumer device data regarding a plurality of consumer mobile devices, the consumer data comprising device use data, prior purchase data, and location data; receiving video surveillance data related to at least one consumer having the consumer device data; providing digital signage data to a plurality of in-store items available for purchase; interrelating, from at least one non-transitory computer-readable medium storing at least the consumer device data, the video surveillance data, and the digital signage data, of at least the consumer device data, the video surveillance data, and the digital signage data by at least one computing processor; and applying, by the computing processor, of a plurality of business rules to the interrelated datas to communicate uniquely with a one of the at least one consumers via at least the digital signage.

4 Claims, 4 Drawing Sheets

APPARATUS, SYSTEM AND METHOD FOR STIMULATING AND SECURING RETAIL TRANSACTIONS

CROSS-REFERENCE TO RELATED APPLICATIONS

This application claims priority to U.S. Provisional Application Ser. No. 61/762122, filed Feb. 7, 2013 entitled, "Apparatus, System and Method for Stimulating and Securing Retail Transactions"; U.S. Provisional Ser. No. 61/762106, filed Feb. 7, 2013 entitled "Apparatus, System and Method for Secure Transactions and Monitoring in a Retail Environment" and U.S. Provisional Ser. No. 61/762113, filed Feb. 7, 2013 entitled "Apparatus, System and Method for Facilitating and Securing Access to Transactions in a Retail Environment", the entire disclosure of which are incorporated herein as if set forth in its entirety.

BACKGROUND

1. Field of the Disclosure

The instant disclosure relates to retail transactions, and, in particular, to apparatuses, systems and methods for stimulating and securing retail transactions.

2. Background of the Disclosure

In the present retail market, it is generally the case that tethered point of service (POS) devices are used in-store to provide a variety of functionality. These tethered POS devices include, by way of non-limiting example: cash registers that scan items either at the direction of a cashier or the direction of a consumer (at "self checkout") in order to allow for a transaction, i.e., to allow the user to be charged for goods desired for purchase; and tracking devices, such as cameras and scanners, for tracking consumer patterns and for POS tracking of purchased or unpurchased items. These tethered POS devices thus provide for transactions, and help minimize loss in the form of mistake or theft.

Moreover, transactions at these tethered POS typically include further limiting factors for high value, high theft items. For example, high value items may be locked, such as in a locking cabinet, in order to minimize theft. Unfortunately, the locking of high value items also typically decreases prospective sales of such items.

Yet further, notwithstanding the digitalization of the retail environment, particularly through digital signage, effort has not yet been expended to take advantage of the proliferation of mobile devices proximate to the digital signage in many retail environments. Additionally, in-store digital signage, at present, offers little advantage in targeted sales over newspaper advertisements or roadside billboards.

However, the retail environment is changing rapidly, particularly with the advent of smart phones. "Mobile checkout" using smartphones and like devices is increasingly desired by consumers, but mobile checkout leads to a plurality of issues, particularly with respect to a loss by mistake and theft. Further, mobile checkout may give rise to issues with regard to, for example, loyalty programs and the like, as well as consumer and consumer purchase tracking. Additionally, even mobile checkout offerings do not allow for the use of mobile devices to increase sales of the aforementioned locked items.

Therefore, the needs exists for an apparatus, system, and method to allow for mobile checkout and in-store shopping in a secure manner, but also in a manner that decreases the probability of theft and mistake while improving consumer tracking, and to take advantage of, among other aspects, the digital signage frequently found in retail environments to stimulate retail transactions.

SUMMARY OF THE INVENTION

The present invention is and includes at least an apparatus, system and method of stimulating a retail transaction. The apparatus, system and method may include obtaining, via an opt-in to an in-store wireless network, of consumer device data regarding a plurality of consumer mobile devices, the consumer data comprising device use data, prior purchase data, and location data; receiving video surveillance data related to at least one consumer having the consumer device data; providing digital signage data to a plurality of in-store items available for purchase; interrelating, from at least one non-transitory computer-readable medium storing at least the consumer device data, the video surveillance data, and the digital signage data, of at least the consumer device data, the video surveillance data, and the digital signage data by at least one computing processor; and applying, by the computing processor, of a plurality of business rules to the interrelated datas to communicate uniquely with a one of the at least one consumers via at least the digital signage.

Thus, the present invention provides an apparatus, system, and method to allow for mobile checkout and in-store shopping in a secure manner, but also in a manner that decreases the probability of theft and mistake while improving consumer tracking, and to take advantage of, among other aspects, the digital signage frequently found in retail environments to stimulate retail transactions.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts.

DETAILED DESCRIPTION OF THE EMBODIMENTS

Figure 1:
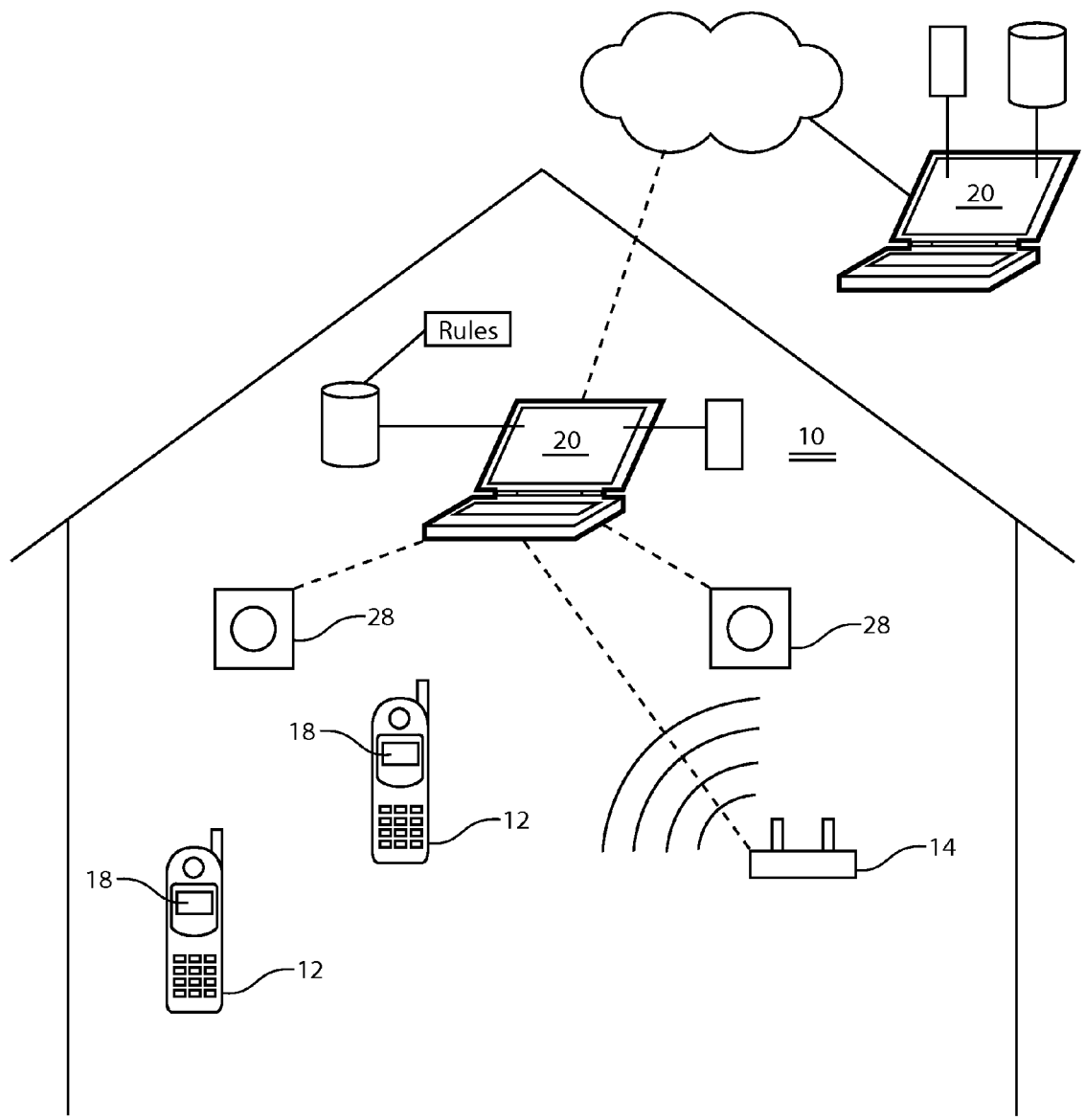
FIG. 1 illustrates aspects of the disclosed embodiments.

It is to be understood that the figures and descriptions of the present invention have been simplified to illustrate elements that are relevant for a clear understanding of the present invention, while eliminating, for the purpose of clarity, many other elements found in typical retail environment, electronic purchase, telecommunications network, and security, apparatuses, systems, and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to the disclosed elements and methods known to those skilled in the art.

The present invention is and includes apparatuses, systems, and methods that may be provided, for example, by a smartphone, such as in an "app" associated with the smartphone, wherein consumers may engage in mobile self or assisted checkout using the app and/or the smartphone without accessing tethered points of service in making retail purchases. Those skilled in the art will appreciate, in light of the discussion herein, that a phone, smart phone, or like term, may include any type of mobile computing device, including a PDA, a tablet computer, a laptop, or the like. The present invention also provides, through the use of such embodiments, the maintaining of security of goods, security of the purchase transaction for the buyer and seller, decrease in loss and theft, and improvement in consumer, employee and purchase tracking, in real time and over predetermined time periods. The technologies provided herein may thus include and/or be partially dependent upon location-based technologies, such as GPS or triangulation. Thus, with respect to GPS, the as used herein may include any location based technologies. For example, a user may have GPS location services turned off on the user's phone but, should the user opt into the in-store network, the user's phone may still be located via, for example, triangulation with knowledge of the user's MAC address or the like. The systems and method provided herein may further include features dependent upon near field communications (NFC), radio frequency identification (RFID), Bluetooth, or like wireless reading technologies, as well as including aspects dependent upon UPC, JAN, barcodes, QR codes, EAN codes, or the like.

In previous retail embodiments, most retail establishments provide point of service (POS) purchase systems. In such systems, a barcode or like identifying code, such as those referenced above, is read, typically by a scanner, or is entered by a cashier. When the code is scanned, thereby indicating that a consumer desires to make a purchase, that code is sent to a database which associates the item for purchase with the barcode or like code, and which associates that item for purchase with a purchase price. Thereafter, the consumer is asked to pay that purchase price via cash, credit card, debit card, or the like.

However, it is becoming increasingly prevalent that retailers offer, or wish to offer, opt-in programs for in-store Wi-Fi, thereby allowing in-store processes to be untethered from POS. Further, to the extent such opt-in programs are offered for Wi-Fi, opt-out programs may similarly be offered, although a retailer may place limitations on an opt-out program. However, for a variety of reasons, it is still atypical that the available untethering of many in-store transactions has occurred prior to the instant invention. These reasons include lack of acceptable transaction security and increased likelihood of theft, among other reasons.

In an example of a non-purchase in-store transaction, it is also typical that in-store tracking of consumers occurs, particularly using security video. For example, several large retail chains employ digital (such as Internet protocol, or "IP") or analog-based camera systems through which security personnel can see all, many, or some portions of the store simultaneously. In such embodiments, it is typical that in-store staff watches security cameras across the store as well as purchase transactions at the POS of purchase, such as in order to enforce loss prevention mechanisms in real time. Such security video may additionally be maintained or recorded, and, as discussed further herein, the present invention may provide the ability to use and manage such security video locally, remotely, via mobile application, or the like.

It is further the case that, in prior retail embodiments, retailers employ exception based reporting (EBR). In the course of an EBR transaction, the transaction is viewed in light of a plurality of business rules that indicate the relative value of the transaction. In an EBR system, particularly high value transactions are focused on, particularly from a security, loss, mistake and/or theft standpoint. In present day systems, EBR tracking gives insight into relevant retail factors for high value transactions, although present systems are exclusively tethered, and include solely batched data.

In view of the foregoing, it is evident that previously available systems provide a plurality of mechanisms that might improve the convenience, speed and security of mobile checkout, but it is also clear that these mechanisms give rise to a plurality of difficulties for mobile checkout that have gone previously unaddressed. For example, with respect to the foregoing EBR discussion, were a transaction to occur anywhere in the store other than a tethered POS subject to security cameras and through which a purchaser would be "funneled" to exit the store, the ability to isolate that high value transaction appreciably decreases. By way of non-limiting example, in a EBR context that employed mobile checkout, a consumer might much more readily swap price tags in a remote aisle and engage in a mobile checkout in which the consumer pays $9.99 for a shirt that originally had a tag on it for $99.99. This happens, in part because it is difficult to use EBR to isolate this transaction in a remote aisle of the store in a mobile checkout context.

Thus, the present invention may provide, as illustrated in FIG. 1, an opt-in Wi-Fi system 10, wherein a smart phone 12 may opt-in to an in-store Wi-Fi network 14. The phone may further include on or more apps 16 that allow for mobile checkout 18, such as secure apps that allow an item to be scanned by the phone, have the price of the item received by the phone, and access given to a payment capability on the phone for the scanned item, such as access to credit card data, Google Wallet, or the like of the phone's owner. Additionally, a system in accordance with the invention may include one or more video cameras 20 that may focus on consumers throughout the store, and/or that may be directed to consumers when an item is scanned for mobile checkout.

For example, a consumer that has opted-in to a Wi-Fi network may, knowingly or unknowingly, accordingly provide information regarding the user's smart phone 12, such as the user's SIM information, MAC address, or the like, during the Wi-Fi opt-in process. Thereby, the user's phone may be tracked by any method known to those skilled in the art, including but not limited to GPS, triangulation via cellular towers or wireless nodes, or the like. Thus, when a user makes a purchase, the user's specific physical location may be known, and thereby in-store security cameras may look to the consumer as an item is being scanned. Thus, the present invention provides a system wherein video may be targeted to a consumer or an employee scanning an item based on the GPS signature, or like location signature, of a device making the scan. Further, the actions of the scanning consumer or the scanning employee may thus be immediately known, either locally or remotely, via the video. For example, IP video may be made available locally and remotely, such as at a central security hub, and may further be available to store manager or security personnel apps, such as may be carried around the store with a security guard.

The aforementioned real-time camera scan of a consumer scanning an item may be useful not only for theft prevention, but additionally in the treatment of "showrooming." As used herein, showrooming is a process wherein a consumer may scan a particular item in a retail context, but only to check the pricing in the retail context against the on-line price of the item being scanned in-store. The method discussed herein, wherein a scan by a consumer indicates, via the opted-in Wi-Fi network, that the consumer is scanning the item, and wherein in-store cameras provide insight into the consumer's actions, allows for in-store personnel to take particular action with regard to showrooming. For example, in-store personnel may provide the consumer with a coupon, a discount, loyalty points, or the like, while the consumer is still or near in the aisle in which the showrooming scan occurred. This may incentivize the consumer to purchase the item in-store, or may, over time, incentivize the user to be loyal to the store and stop showrooming.

Those skilled in the art will further appreciate, in light of the discussion herein, that, due to the consumer's opt-in to the Wi-Fi network and the consequent availability of the identifying characteristics of the consumer's phone, store personnel and/or an in-store computing server may know what the user is viewing on a phone. This provides store personnel with an indication that showrooming is occurring, or that a third party app on the user's phone is in use, or the like. Due to this ability, store personnel or the computing system may send a coupon or discount mechanism directly to the user's phone, such as to the aforementioned store-app on the user's phone. This coupon or discount may occur automatically from the store's computing system based on one or more business rules in the store computing system.

For example, the computing system/server 20 illustrated in FIG. 1 may monitor the network, the phone activity of user's that have opted-in to the network, and/or in-store cameras. Thus, if a scan on a particular phone is sensed in conjunction with, for example, use of a third party app, the business rules may indicate that the computing system provide to the phone of the user engaging in the scan a discount or coupon, with or without intervention of store personnel.

Not only does the foregoing system, and the described method(s) performed therein, lower the likelihood of theft, but additionally the system and method(s) allow for in-store data tracking, purchase pattern tracking, enhanced EBR tracking, employee action tracking, customer tracking, loyalty tracking, and the like. More particularly, multiple ones of the foregoing records may be tied together over a pre-determined timeframe, such as wherein consumer purchase patterns may be gauged weekly, monthly, annually, and the like, such as for all consumers based on phone identifiers, or for consumers that are, for example, members of an in-store loyalty program.

Further, the computing system of a retail store or a retail chain may thus have a record of what phone each consumer uses, whereby providing unique information to each consumer's phone may be made easier. For example, a consumer in possession of an iPhone may be offered, while in-store, a mobile app, a coupon app, or the like, such as for that retail chain in which the user is then shopping. Further, it is known to the computing system that the particular consumer should be offered an iPhone application while in-store, rather than an Android application, by virtue of the fact that it is known that the consumer is using an iPhone.

The computing system 20, or an associated remote computing system communicatively connected to the computing system 20, may engage in pattern/trend analysis. This pattern analysis may provide not only the aforementioned patterns and trending for one, multiple, loyal, frequent, or the like consumers, but may additionally provide the ability to do pattern analysis for particular employees, groups of employees, particular stores as among other stores in a retail chain, and the like. Accordingly, theft may be more readily prevented, and additionally information profiles, both for consumers and employees, may be created.

By way of non-limiting example, a particular store employee may give a $50 cash refund to a consumer who makes a return without a receipt. When this behavior is engaged in, a record is maintained of that employee's mobile scanning device identifiers, the transaction is associated therewith, and a video signature of the transaction may also be maintained by the computing system. If the same employee engages in the behavior a certain number of times, such as eight times over a six month span, the pattern analysis rules of the rules engine associated with the computing system 20 may indicate a pattern on behalf of that employee of participating in likely theft. Further, for each or all such instances, the computing system of the present invention can verify whether the consumer did, in fact, make the purchase in-store, such as by assessing the user's phone signature and a geo-synched in-store video signature. If it is indicated that for multiple ones of the aforementioned eight transactions the user did not actually make the purchase in the store based on transaction/video/phone records, this again increases the likelihood that the employee is actively participating in theft.

Further, the present invention may employ the aforementioned aspects to prevent "roundabouting." As used herein, roundabouting indicates that an item has been taken off of a shelf, walked to the front of the store without purchase, and a consumer has endeavored to return the item to the store unpurchased and without a receipt. The system of the present invention, and as illustrated in FIG. 1, will recognize, based on the MAC address, SIM information, or the like of the consumer's smart phone, as well as the GPS signature of the phone, the in-store video signature of near-in-time transactions, etc., and the consumer's in-store actions, that the user did not, in fact, purchase the item prior to attempting a return.

Those skilled in the art will appreciate in light of the discussion herein that the performance of the system and method discussed herein may be improved by forcing consumers and employees to opt-in to the in-store Wi-Fi network. In order to stimulate this behavior, in-store opt-in may be required to enable mobile-check out or other in-store services or discounts, or the opt-in may be enticed, such as by being required on each trip into the store if the user intends to use a loyalty program while in-store.

In short, the present invention may thus allow for mobile checkout, and may link this mobile checkout to GPS (location) and video records in-store. Further, data from the consumer's device may be obtained and stored, and may be stored as or in conjunction with the user's activity data, GPS data, video data, and the like. Finally, this data may be tracked, and may be manipulated to obtain business intelligence that indicates trends for the pattern/trend analysis as directed by the business rules associated with the computing system 20 and as discussed above. Those skilled in the art will further appreciate that data, as that term is used herein, includes entry of the data, which may include user activity on a phone as read by the opted-in Wi-Fi network, the reading of a barcode, an NFC read, a Bluetooth read, a movement between departments within a store, and the like. As used herein, the term data also includes data schema, including data formatting, that may be employed with respect to accumulated, read or interrelated data. Further, data, as the term is used herein, may include created data rather than tracked or accumulated data. Such created data may include, for example, the integrity score discussed below. Data may further include atypical data in a retail context, such as biometrics data as may be tracked by a video, phone usage (such as a fingerprint read engaged in by a telephone app) and the like.

As discussed herein, video tracking and management services are currently provided for many large retail stores. Such providers of video management, as well as providers of other in-store applications typically employed in a retail context, may provide an open API library that allows third parties to "hook" applications into the open API system provided.

Accordingly, the aspects of the present invention discussed herein may be hooked as "applications" into existing systems, such as to provide branded or white label mobile checkout apps, or the like. Further, in such a context, the aspects of the present invention may be associated with other applications that may additionally enhance the security of the transactions engaged in a mobile checkout context. For example, exterior video may be used in conjunction with the in-store video to provide an ability to track license plates, whereby a user may be tracked in-store, as discussed herein, and then may be tracked leaving the store and getting into a vehicle that is associated with a license plate which may provide for subsequent tracking and locating of the user.

Figure 2:
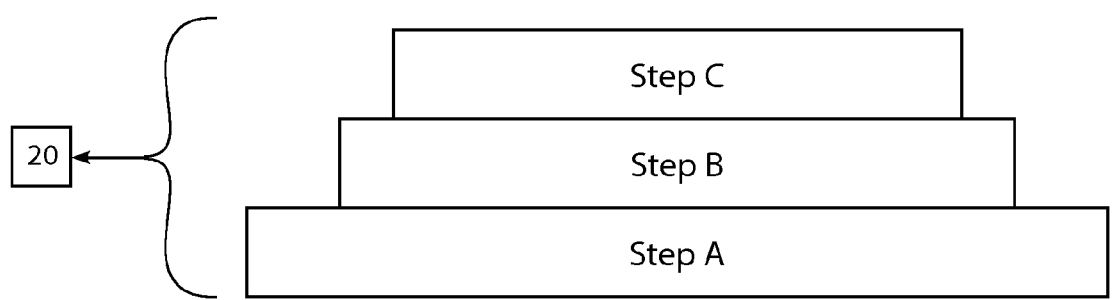
FIG. 2 illustrates aspects of the disclosed embodiments.

FIG. 2 is a hierarchical diagram illustrating, at Step A, the generation of data regarding phone use, GPS, video surveillance, and the like, in-store. At Step B, this information is accumulated and may be interrelated. For example, at Step A, only phone and GPS data may be indicated, but such data may be linked together, or, GPS, phone, video, and use data may be generated by a particular mobile device and may be accumulated and related to that particular mobile device, at step B.

At Step C, data analysis that may indicate that a particular action is performed, such as based on business rules as applied to the interrelated data of step B. For example, at Step C, a shopper integrity score may be issued. The shopper integrity score may be an indication of the risk level of a particular consumer that is then in-store. The shopper integrity score may be numerical score, and/or may be shared with in-store personnel. As such, shoppers having a particular shopper integrity score, such as a particularly high shopper integrity score, may be invited to participate in particular programs, such as by receiving targeted advertisements, coupons, red carpet services, such as the unlocking of secure cabinets, or the like, either manually by in-store personnel or automatically by the computing system discussed in FIG. 1. Accordingly, systems and methods discussed herein may not only be used to increase the security of goods sold, the security of in-store transactions, and to target particular consumers, but may additionally be used to obtain and retain the most desired shoppers. For example, the presence of those desired shoppers may be assessed, and the store may endeavor to increase the level/amount of shopping and/or participation in loyalty programs by these most desired shoppers, such as based on the aforementioned shopper integrity score.

For example, a particularly high integrity scored user may walk past a locked cabinet that has therein high value items, such as electric shavers. As the user passes the locked cabinet, the user may be provided with a coupon, advertisement, alert, or the like, because of the user's high integrity score or loyalty score, or the user may be provided with such coupons, ads, or alerts simply because the user has been monitored as purchasing a great many disposable razors, or as having a preference for frequently purchasing electric shavers. Similarly, the cabinet may be unlocked, such as by an electronic key or token sent to the user's phone, wherein the user's phone engages with an NFC or Bluetooth transaction with the cabinet.

More particularly, the present invention may generally provide keyless entry to secure display in a retail or residential context, wherein such keyless entry may occur via mobile device key. For example, high theft, high value items may be maintained, in a retail context, in the aforementioned locked cabinet or behind a counter, as may be, for example, dangerous items in a retail or residential context. Examples of such items in a retail context may include, for example, Apple's iPad, and in a residential context may include, for example, guns.

In a retail context, sales go down when an item is maintained in a locked environment. This occurs for a variety of reasons, such as inconvenience or social awkwardness to the user in endeavoring to obtain access to the locked cabinet, the lack of store personnel to open the cabinet, and the like. However, many such items may have theft rates of 50% or more if the items are left out on shelves. Further, there is a danger of enhanced theft by employees of such high value items, such as wherein physical keys are needed to be returned by departing employees or wherein keypad codes to access locked cabinets must be changed upon employee changeover.

Thus, in embodiments wherein a mobile device is used by an in-store user, and wherein the user may wish to gain access to high value items in locked locations, and/or wherein a retailers offers a Wi-Fi opt-in, the present invention may provide a solution to the foregoing issues. More particularly, the lock may be opened via mobile device key or token for particular users. For example, as a threshold issue, a user may need to opt-in to the in-store Wi-Fi network in order to be provided with automated unlocking services. This may be the case because a user may be flagged as a higher risk if the user refuses to opt-in to thereby identify him-herself to the in-store network. After opt-in, the user's phone may be assessed as to capabilities, such as Bluetooth, NFC, RFID, and the like. Data regarding the user may be accumulated, such as the user's integrity score, shopping history, loyalty program membership, and the like. Further, the user's behavior may be assessed, such as, for example, via video. In accordance with one or more of the previously mentioned items of information, it may be assessed that the user is a good candidate to make a purchase from a locked cabinet. Accordingly, the user may, upon requesting a key to a locked cabinet, be granted that key within a certain distance of the cabinet, such as within 20 feet of the cabinet as indicated by a GPS. Alternatively, the user may be automatically offered or provided with a key, such for a predetermined time limit or within a predetermined distance from the cabinet. Moreover, a key may be unnecessary, as GPS tracking may allow for the cabinet to be automatically opened as the user passes by or while the user is within a certain distance from the cabinet. For example, a cabinet may be opened only while that particular user is within eight feet of the cabinet, or a key or cabinet unlock may expire in 20 seconds, 60 seconds, or a like predetermined timeframe.

Further, in accordance with the present invention, the user may be provided with an advertisement for high value items that are generally kept locked. For example, the user may be provided, in the prior example, with an advertisement for electric razors, such as based on the user's frequent history of purchasing blade razors, and the user may be provided with the electronic mobile key to the cabinet along with the advertisement. Such key may be provided only to the best customers, only to loyalty program members who have previously entered significant amounts of information, or the like. Further, as mentioned above, the user may be watched on video as the user approaches the cabinet. Of note, even high integrity users may be monitored to further lower the likelihood of theft. Of course, this video monitoring may occur constantly of the locked cabinet area of the store, and/or the camera may be trained on the user based on that user's GPS, MAC address, or the like information.

In accordance with the discussion herein, a user's profile, such as a loyalty profile or other detailed information profile, may be linked to the user's Google Wallet. Thereby, the user's Google Wallet may be charged if the user endeavors to depart the store with an item that does not show having been paid for.

Alternatively, in order to prevent an awkward situation particularly with a user with a high integrity score, the user may be pinged with a message, such as "We are sorry, it appears you forgot to pay for item X", whereafter the user may be offered to either return the item to the store, or let the retailer know how the user wishes to pay for the item, or the store may indicate to the user that the user's Google Wallet will be automatically charged in a certain timeframe, such as 48 hours, or the store may indicate to the user that the user will be charged the next time the user enters the store, or the like.

Figure 3:
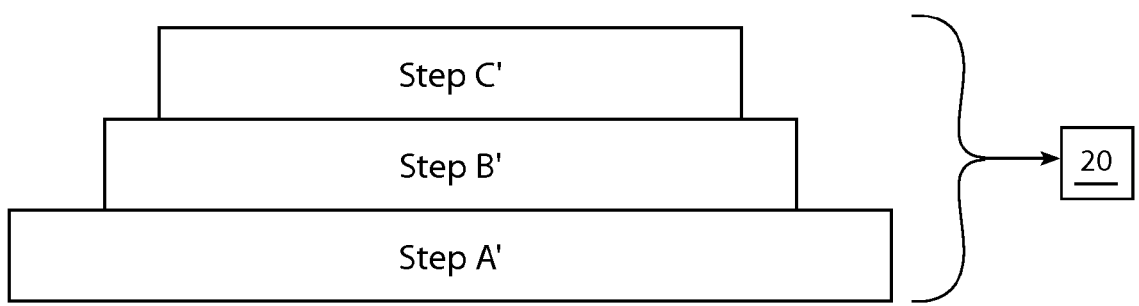
FIG. 3 illustrates aspects of the disclosed embodiments.

FIG. 3 illustrates enhanced hierarchical aspects in addition to those illustrated in FIG. 2. For example, the hierarchy of FIG. 3 may include the use of a mobile device to engage an electronic lock at Step A'. At Step B', this interaction may further include, by way of non-limiting example, video monitoring of the user engaging the electronic lock. Step C' may additionally include, for example, GPS location monitoring of the user in conjunction with video monitoring as the user engages the lock.

Certain users may receive not only high integrity scores, but additionally may receive valuable consumer scores. For example, such a user may not only have high integrity, but may additionally have high integrity in the frequent purchase of expensive items. All of that information may be accumulated in accordance with the present invention, and may indicate not only to a particular retailer but across different retailers that that consumer is one who should be targeted by those retailers as a valuable customer.

As discussed above, many retail outlets that may make use of the aspects of the present invention also provide in-store and/or opt-in store Wi-Fi networks. Further, many such retail stores provide, in different manners as will be known to those skilled in the art, digital signage. Such digital signage may include, by way of non-limiting example, advertisements or information provided based on proximate merchandise, more distant in-store merchandise, pricing on merchandise, or the like. Digital signage may be provided by, for example, by an LED screen, and LCD screen, or the like. Such digital signage may be connected to a network, such as the aforementioned in store wireless network, or may not be connected to a network.

Broadly stated, digital signage may include any digital device that interacts with a consumer. Such a digital device might be or include, for example, a smart mirror in which a consumer can interact with an image of him/herself, such as to view how consumer items would fit that consumer's image. Further, a user may be enabled to buy directly by interacting with the provided web content shown in the smart mirror. In any such embodiment wherein a user may interact with the digital signage, the user's smart phone, for example, may provide an interactive tool to: get the consumer to express her preferences; share information, such as the aforementioned captured image, with friends, such as to get advice; write recommendations or make posts to her social profile, such as regarding the products she is engaging with; receive options, offers or coupons based on preferences; or make purchases, by way of non-limiting example.

Using the various mechanisms discussed elsewhere herein, digital signage may be communicative with the plurality of mobile devices of consumers within a retail store. For example, such communication may occur by a one or more of the in-store wireless network, NFC, Bluetooth, or RFID, and may occur as a consumer passes by the digital signage. For example, communication by the digital signage to the mobile device may occur by activation of one or more of the foregoing communication types/networks, such as based on a location of the consumer as assessed by that consumer's mobile device GPS, or the like. The association of a consumer's mobile device with such digital signage allows, through the use of the present invention, for the providing of targeted content to the consumer, via either or both of the consumer's mobile device and the digital signage.

For example, targeted content may be based on a consumer's purchase history. As discussed elsewhere herein, a retail store or chain of retail stores may accumulate data with regard to a consumer's in-store transactions and shopping habits, may possess loyalty data with regard to the consumer, and may possess information regarding mobile device activity of the consumer, among other records of consumer data. Based on these or similar consumer data, the digital signage discussed herein may recognize the presence of a consumer in a line of sight to, and/or in proximity to, the digital signage, and based on the consumer's data the digital signage may be instructed, such as by the computer system 20 of FIG. 1, to present to the consumer in line of sight, or proximate to, the targeted content. Of course, the consumer's position may also be assessed via geo-location of the consumer's mobile device, by in-store video, and by other means known to those skilled in the pertinent arts. The location of the digital signage may be throughout the store, including, for example, in dressing rooms.

Targeted content may include, for example: advertisements uniquely targeted to the consumer; coupons or advertisements provided to the consumer based on, for example, a scoring of the consumer, such as a credit score or a shopper integrity score of the consumer; attachment sales, herein defined to include those sales of goods associated with goods already selected for purchase or likely purchase by a consumer; or suggested selling to the consumer, wherein, based on data records of the consumer, such as prior purchases, goods are suggested by the digital signage for purchase by the consumer.

For example, based on things that a consumer has purchased via mobile checkout, or items that a consumer may have in the cart (which may be assessed by a RFID, barcode, NFC, Bluetooth, or the like, scanned either by aspects within the store or by the consumer), digital signage may, independently or association with the aforementioned computer system, assess what the consumer has purchased or is about to purchase. The digital signage may, accordingly, suggest to the consumer matching items to those about to be purchased or previously purchased.

For example, a consumer may have just engaged in mobile checkout to purchase a tie, and may further have in the consumer's cart a shirt having associated therewith a bar coded tag. The shirt with the bar coded tag may have been scanned by the consumer (such as for the purposes of show rooming), but the presence of the shirt in the consumer's cart may indicate that the consumer has elected to purchase the shirt in-store. The digital signage, through the use of the business rules associated with the computer system as discussed above, may assess that the purchased tie matches the shirt that is about to be purchased, and that the digital signage immediately adjacent to a plurality of designer suits is in the line of sight of the user and within 10 feet of the consumer. Further, it may be assessed that the designer suits match the shirt/tie combination that the consumer clearly desires/has purchased. Further, it may be assessed, such as via the consumer's history associated with the consumer's mobile device, that the consumer had purchased one month earlier dress shoes that would also match the shirt, tie and suit combination. Accordingly, the digital signage may display a uniquely tailored advertisement for the particular consumer indicating that the suits that the user is approaching would match the shirt, tie and shoes to provide the user with a complete outfit.

In a similar example, the system of the present invention may draw on external data, such as data available via the Internet, particularly in an in-store network embodiment. For example, a consumer may have purchased the movie "Breaking Dawn" from a particular retail store two months prior. With this knowledge, and equipped with the knowledge, such as based on Internet surveys that viewers who liked the movie "Breaking Dawn" also typically like the movie "Hunger Games," digital signage may, when sensing the consumer who purchased "Breaking Dawn" approaching the digital signage, display that on a shelf associated with the digital signage is the movie Hunger Games, and many viewers who enjoyed the movie Breaking Dawn enjoy the movie Hunger Games.

Accordingly, the present invention provides the capability of real-time advertising, real-time couponing, real-time attachment sales, real-time suggestive selling, and the like. Further, the present invention allows for these real-time aspects to be provided on the mobile device, on digital signage proximate to a user of the global device, or on a combination thereof. For example, targeted content may be provided to a mobile device as the mobile device is proximate to particular digital signage. For example, a preview of a particular movie may be automatically delivered to a consumer's phone as the consumer passes a shelf in-store on which the movie resides for sale. Further, digital signage associated with the shelf on which the movie resides may change to display to the consumer as that consumer approaches, "Did you enjoy the preview that you just received? If so, please stop here and pick up the whole movie!"

Further, unique content may be provided via the digital signage discussed herein. For example, in the prior example of a consumer receiving the suggestion to purchase a suit, a picture of the consumer may be displayed in a manner digitally modified to be wearing the suit on the display. The consumer's picture may be obtained, for example, from content on the consumer's phone accessible via the consumer's opt into the wireless network, via in-store video, or by other known methods. Further, outside demographic data may be employed, independent from or in conjunction with a consumer's profile accessible via the phone associated with the consumer based on the consumer's opt in to the wireless network, in order to provided real-time suggested sales to the consumer. For example, it may be assessed that males between 35 and 50 rate a particular book very highly, and the consumer's profile, such as may be entered into a loyalty program or as may be accessible via the consumer's phone, may indicate that the user proximate to the digital signage is indeed a male between the ages of 35 and 50. As such, the digital signage (and/or suggestive advertising sent to the consumer's phone) may target that consumer as the one likely to enjoy reading the particular book on a shelf associated with the digital signage.

Further, in such a suggestive selling context, data may not solely be available via a phone for matching with outside demographic data, but rather in-store video may also provide a basis for suggestive selling via digital signage. For example, in-store video may indicate that a mother is shopping in a retail store with her two small children. Accordingly, digital signage may be modified as the mother and children pass the digital signage in order to suggest items that may be of interest to either a mother of small children, or that may be of interest to the children.

Of course, the providing of such suggestions by digital signage and/or mobile devices may be location based, such as based on a department in which a consumer is located in a department store, as discussed herein throughout. Moreover, digital signage may be used for additional purposes in conjunction with advertising and/or suggestive selling, such as wherein a digital sign indicates to a particular consumer via a personalized message to look at that consumer's phone. Correspondingly, the consumer's phone may receive an advertisement and/or an offer specific to that consumer, or other applications may occur such as are indicated by the computer system discussed with respective to FIG. 1. For example, when the consumer looks at the consumer's phone, the consumer's face may be captured, such as via the consumer's phone pursuant to an indication from the in store computer system, or via the retail store's video system, and from the consumer's face capture, a bio metric profile may be created and/or compared against, such as in order to enhance in-store security.

Yet further, indicating to particular consumers to look at their phone via digital signage may allow for different customers to receive different coupons, as indicated by digital signage, without other customers knowing that all customers are not receiving the same level of coupons. That is, in such a system, it may be preferable, such as based on a level of loyalty program participation, that digital signage indicate to John to view his phone for a coupon, whereafter John receives a 15% discount on his phone. But when Ben to be instructed to look at his phone, Ben receives only a 10% discount coupon on his phone. Obviously, this is preferable to having digital signage display to both Ben and John that John will receive a 15% discount, but Ben will receive only a 10% discount. Such a scenario would, needless to say, frustrate Ben.

Figure 4:
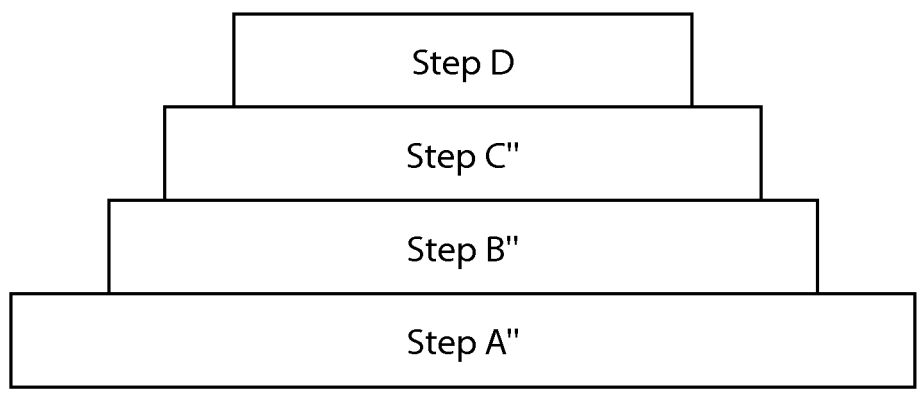
FIG. 4 illustrates aspects of the disclosed embodiments.

FIG. 4 is an additional hierarchical diagram that may be used in addition to the hierarchy of FIG. 2, and/or in conjunction with the additional hierarchy of FIG. 3, wherein Step A" includes a relationship between a mobile device and digital signage. At Step B", data entry and data may be added to the mobile and digital signage relationship. At Step C", digital analysis may be added to the data, mobile device, and digital signage relationship, and in Step D feedback may occur based on the digital analysis performed in Step C.

Thus, an app provided in accordance with the discussion herein may be a retailer-specific in-store mobile checkout app, or may be a white labeled, i.e., a generic, mobile checkout app. Further, use of the mobile checkout app may require Wi-Fi opt-in at least in order that the security information discussed herein may be obtained from the consumer's mobile device to enable mobile checkout.

In accordance with the discussion herein, the in-store computer system may allow for monitoring, either locally in-store or remotely over a network, all that each consumer does while in-store. That is, user opt-in to the Wi-Fi network may allow for planting of an apt on the user's phone, either temporarily while in-store or permanently, such as when the user accepts or downloads the in-store app, that allows for monitoring of the user's mobile device usage. This monitoring includes not only the user's in-store purchases, but may additionally include user's purchasers in other stores, on-line, who the user talks to on the phone, what the user watches on his or her phone, activities engaged in on the user's phone, etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is rather to be accorded the widest scope consistent with the principles and novel features disclosed herein.

What is claimed is:

1. A method of providing mobile checkout, comprising:
    obtaining, via an opt-in to an in-store wireless network, consumer device data regarding a plurality of consumer mobile devices, the consumer data comprising device use data, prior purchase data, and location data;
    receiving video surveillance data related to at least one consumer having the consumer device data;
    providing digital signage data to a plurality of in-store items available for purchase;
    interrelating, from at least one non-transitory computer-readable medium storing at least the consumer device data, the video surveillance data, and the digital signage data, of at least the consumer device data, the video surveillance data, and the digital signage data by at least one computing processor; and
    applying, by the computing processor, a plurality of business rules to the interrelated datas to communicate uniquely with a one of the at least one consumers via at least the digital signage.

2. The method of claim 1, wherein the digital signage data comprises one selected from the group consisting of UPC, JAN, barcodes, QR codes, EAN codes, and combinations thereof.

3. The method of claim 1, wherein the consumer data comprise exception based reporting.

4. The method of claim 1, further comprising:
    delivering to at least one non-consumer an indication of said applying of the plurality of business rules.

* * * * *